March 19, 1935. J. A. KIENLE ET AL 1,994,822
LIQUID MEASURING DEVICE
Filed Jan. 16, 1930
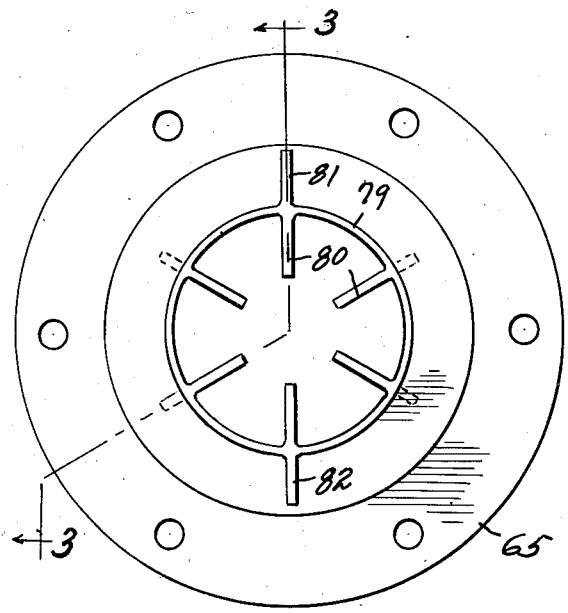
*Fig. 2.*
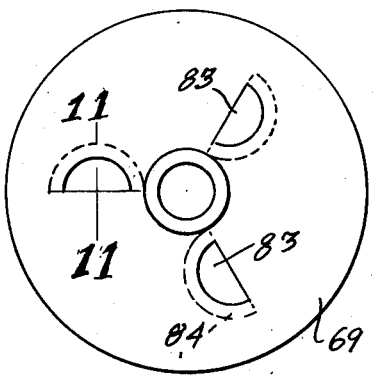
*Fig. 4.*
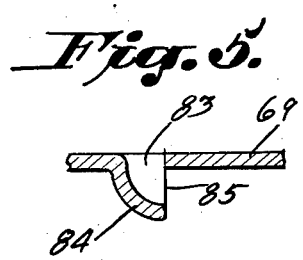
*Fig. 5.*
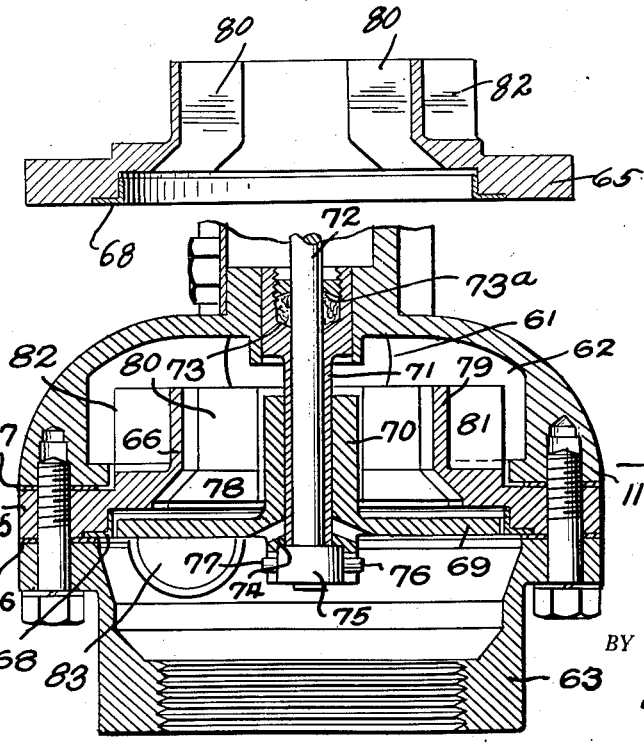
*Fig. 3.*
*Fig. 1.*
INVENTORS
JOHN A. KIENLE
PAUL G. CHACE
BY
ATTORNEY.

Patented Mar. 19, 1935

1,994,822

UNITED STATES PATENT OFFICE 1,994,822

LIQUID MEASURING DEVICE

John A. Kienle and Paul G. Chace, Detroit, Mich., assignors to W. M. Chace Valve Company, Detroit, Mich., a corporation of Michigan Application January 16, 1930, Serial No. 421,105

4 Claims. (Cl. 73—37)

This invention relates to measuring devices and a feature of the invention is involved in the provision of a wheel lying in a liquid passage and rotatable by flow of liquid. Further features are involved in means for causing the liquid to pass centrally to the wheel and to prevent whirling motion of the liquid as it passes to the wheel.

These and other objects and novel features of the invention are hereinafter more fully described and claimed and the preferred form and construction of a valve embodying our invention are shown in the accompanying drawing in which—

Fig. 1 is a vertical section through a measuring device embodying our invention.

Fig. 2 is a plan view of the shield through which the water is discharged to the rotating wheel.

Fig. 3 is a section thereof taken on line 3—3 of Fig. 2.

Fig. 4 is a plan view of the rotating wheel.

Fig. 5 is a section taken on line 11—11 of Fig. 4.

In the preferred construction shown in Fig. 1, between the member 63 and the housing 11, is secured the flange 65 of the baffle 66 which projects upwardly into the chamber 62. The flange 65 is in sealed relation respectively with the member 63 and the housing 11 by packing rings 66 and 67 and is recessed in its lower face to receive a non-corrodible sheet metal ring 68 L shaped in cross section. Positioned within the part of the ring extending into the recess of the member 65 is a rotor 69 formed with a central tubular portion 70 to receive the bushing 71 for the shaft 72. This bushing is supported at its upper end by an enlarged portion 73 secured in the casing 11 and a packing gland 73a is provided in the said enlarged portion 73 to prevent leakage along the shaft. The bushing 71 on which the portion 70 of the rotor revolves terminates short of the bottom end of the shaft and the rotor is there provided with a depending portion 74 fitting over the enlarged end 75 of the shaft and slotted to receive the pins 76 and 77 whereby rotation of the rotor drives a shaft.

The baffle 66 above the rotor has the opening formed with inclined walls 78 and thereabove has the cylindrical wall 79 and through this cylindrical portion 79 all fluid entering the chamber 62 must pass to the rotor.

One of the main features of the invention is involved in this baffle plate and the reason for this upwardly extending cylindrical portion 79 is to cause water flowing into the chamber 62 through the inlet 61 to of a necessity rise to the upper open end of the cylindrical portion before it can flow to the rotor and thus in a sense provide a constant head for the rotor. Also due to the fact that fluid is discharged into this chamber 62 from one or both sides the fluid on entering the chamber 62 has a swirling motion. As this swirling motion varies the rotor would not act in a uniform manner if the water were discharged directly to the rotor. Therefore the baffle not only is provided to secure a constant head or fall of water but is also constructed to eliminate the whirling motion of the fluid before it passes to the rotor. For this reason the interior of the cylindrical portion 79 is provided with radial inwardly projecting baffle plates 80 extending to close relationship with the portion 70 of the rotor. Also preferably there are two baffles 81 and 82 extending outwardly on diametrically opposite sides of the cylindrical member 79 in the chamber 62 which also to a considerable extent check rotation of fluid in the chamber 62. Thus while fluid may be discharged into the chamber 62 from the conduit 61 under various conditions as stated the baffle member provides for a discharge centrally to the rotor and thence outwardly thereof and without any material whirling motion.

The rotor consists of the plate 69 having apertures 83 therein as shown more clearly in Figs. 4 and 5. These apertures 83 are openings to pockets formed by an integral depending portion 84 having an opening 85 on the under side of the rotor and thus to the interior of the flanged member 63 to which an outlet conduit may be connected. These pockets all face in the same direction circumferentially of the rotor and are of such character that water flowing from the upper surface of the plate through the pockets to the lower surface causes rotation thereof. The parts are so fitted that the rotor runs very freely and yet insufficient space is provided between the periphery of the rotor plate 69 and the ring 68 as to permit any material leakage therebetween wherefor; water passing through this housing or chamber 62 to the outlet must pass through the pockets to cause rotation of the rotor and, due to the upwardly extending cylindrical portion 79 of the baffle even though the water be very slowly discharged into the chamber 62, must rise to a certain height. The baffle therefore provides a sufficient head to cause rotation of the rotor under the possible varying conditions of use.

Having thus fully described our invention, what we claim and desire to secure by Letters Patent of the United States is—

1. In a device for measuring a predetermined volume of liquid passing therethrough, a housing connected with a source of supply and having a passageway for liquid, a rotor positioned in the said passageway, a baffle having a recessed face to receive the rotor and having a central portion extending thereabove in a liquid passageway, the relationship of the rotor and baffle being such that all liquid passing through the conduit portion of the baffle passes through the rotor, said rotor comprising a disc like member having apertures, and blade like members on the discharge side of the disc associated with the apertures therein whereby passage of liquid therethrough causes rotation thereof.

2. In a device for measuring a predetermined volume of liquid passing therethrough, a housing having a chamber and providing a passageway for liquid, a rotor rotatably supported in the chamber, a baffle comprising a plate secured in the chamber and having a recess in its lower face in which the rotor is positioned and a portion extending over the rotor and including a central conduit like portion extending upwardly into the chamber determining the minimum head under which the liquid may flow to the rotor, said baffle including baffle plates within the said conduit like portion leading to the rotor, and baffle plates on the exterior of the conduit portion within the chamber, the two series of baffle plates respectively preventing rotation of the liquid body in the chamber and in the conduit.

3. In a device for measuring a predetermined volume of liquid passing therethrough, a housing including a chamber providing a passageway for liquid, a baffle member supported in the chamber and having a central conduit like portion extending vertically upwardly in the chamber, a rotor including an apertured plate rotatably supported and centrally disposed below the said conduit like portion of the baffle, said baffle member having a horizontal portion recessed to receive the rotor and providing a chamber into which liquid from the conduit like portion may discharge radially over the upper face of the rotor and means in the said conduit portion for preventing rotation of the liquid body in passing to the rotor, the arrangement of the rotor and baffle being such that all fluid passing through the conduit is discharged to the rotor to effect rotation thereof, and the height of the conduit like portion of the baffle above the rotor determining the minimum head under which liquid may flow through the rotor.

4. In a device for measuring a predetermined volume of liquid as it passes therethrough, a housing including a chamber providing a passageway for liquid, the inlet to the chamber being at one side thereof, a baffle member supported in the chamber and having a central conduit like portion extending vertically upwardly in the chamber and a horizontal portion recessed to provide a chamber of greater diameter than the said conduit portion open through the lower face of the baffle and to which the conduit opens, a rotor including a flat apertured plate rotatably supported and centrally disposed in the baffle chamber below the said conduit like portion of the baffle, the arrangement of the rotor and baffle being such that all fluid passing through the conduit is discharged to the rotor to effect rotation thereof in passing through the plate apertures, the height of the conduit like portion of the baffle above the rotor determining the minimum head under which liquid may flow through the rotor, and means in the chamber and associated with the conduit like portion of the baffle for preventing rotation of liquid whereby the liquid discharged to the rotor is practically free from eddy currents.

JOHN A. KIENLE.
PAUL G. CHACE.